United States Patent [19]

Gasper et al.

[11] Patent Number: 4,878,844

[45] Date of Patent: Nov. 7, 1989

[54] TEACHING AID HAVING TACTILE FEEDBACK

[75] Inventors: Elon Gasper; Nedra Goedert, both of Redmond, Wash.

[73] Assignee: Bright Star Technology, Inc., Bellevue, Wash.

[21] Appl. No.: 208,881

[22] Filed: Jun. 20, 1988

[51] Int. Cl.$^4$ .............................................. G09B 17/00
[52] U.S. Cl. .................................... 434/159; 400/466; 434/88; 434/113; 434/167; 434/178; D18/24; D18/27
[58] Field of Search ............... 434/113, 114, 159, 167, 434/170, 178, 88, 347, 157; D18/24, 27; 400/466

[56] References Cited

U.S. PATENT DOCUMENTS

| D. 16,374 | 11/1885 | Graham | D18/27 |
| 335,837 | 2/1886 | Peckham | 434/347 |
| 2,075,529 | 3/1937 | Leubrie | 434/88 |
| 3,271,884 | 9/1966 | Robertson | 434/157 |

FOREIGN PATENT DOCUMENTS 193470  2/1923  United Kingdom ............... 434/113

OTHER PUBLICATIONS

Thermography Emerges as a Fine Art, by Peter Johnston, *Graphic Arts Monthly*, Feb. 1982, pp. 48, 49, 55.

Primary Examiner—William H. Grieb
Attorney, Agent, or Firm—Schroeder, Davis & Orliss, Inc.

[57] ABSTRACT

A set of characters is provided wherein each character is formed by arranging a number of relatively small like characters in a pattern that presents a filled-in outline of the character. Each of the small like characters are printed by a thermographic process to provide a character which protrudes slightly from the media surface thus providing tactile feedback when the character is touched or traced with a finger.

4 Claims, 5 Drawing Sheets

```
             AAA                            20
            AAAAA                          /                   23
           AAAAAAA                                            /
          AAAA  AAAA                                                      25
         AAAA    AAAA                                                    /
        AAAA      AAAA             21              aaaaa      aaa
       AAAA        AAAA           /              aaaaaaaaaaaaa
      AAAAAAAAAAAAAAAAAA                          aaaa        aaaaa
     AAAAAAAAAAAAAAAAAAAA                         aaa          aaaa
    AAAAAAAAAAAAAAAAAAAAAA                        aaa          aaa
   AAAA                AAAA                       aaa          aaaa
  AAAA                  AAAA                      aaaa        aaaaa
 AAAA                    AAAA                    aaaaaaaaaaaaa
AAAA                      AAAA                    aaaaa      aaa
```

```
          111
         1111
        11111
          111
          111
          111
          111
          111
          111
          111
          111
       1111111
       1111111
```

TEACHING AID HAVING TACTILE FEEDBACK

BACKGROUND OF THE INVENTION

The present invention relates generally to a set of characters which serve as a teaching aid providing tactile and visual cues as to the identity of the individual characters of the set and, more particularly, to a set of letters of the alphabet wherein each letter is formed from like smaller raised-print letters.

It is well known that young children's sense of touch is well developed; that is, young children can understand and retain much more about an object after they have handled it than if they had only looked at it. Several prior art educational aids and methods take advantage of this characteristic; typically in combination with either or both audio and visual cues. For example, a globe of the world will have the different land masses and countries outlined either by slightly depressed or raised borders as well as being colored in such a manner that no two countries of the same color are adjacent each other.

One prior art teaching aid known as "sandpaper letters" consists of a set of the 26 letters of the English alphabet. Each letter is formed by depositing an amount of adhesive on a plastic plate in the form of the desired letter and then spreading fine sand or the like over the adhesive. When the adhesive dries, a letter is formed which one can feel or trace with the fingers. These sand letters are available in upper and lower case and in block, script or other print forms.

SUMMARY OF THE INVENTION

In accordance with the present invention, letters or other characters are formed by filling in the outline of a desired letter with much smaller raised-print like letters to create a textured letter which provides tactile feedback when traced with a finger to reinforce both visual and audio cues of the identity of the letter or character. To reinforce the association between those letters having very different upper and lower case representations, upper case letter outlines may be filled with tiny raised-print like lower case letters and the lower case letter outlines may be filled with tiny raised-print upper case letters. The textured letters of the present invention may also be combined with audio cues such as an instructor or audio recording speaking the names of the letters or additional visual cues may also be utilized such as an accompanying picture of a well known object with its name beginning with the textured letter. The textured letters of the present invention are printed by standard processes, such as a thermographic process, to provide character sets which are less complex and easier to produce and, hence, less expensive than the prior art sand letters.

DETAILED DESCRIPTION OF THE PREFERRED EMBODIMENT

Figures 1A, 1B:
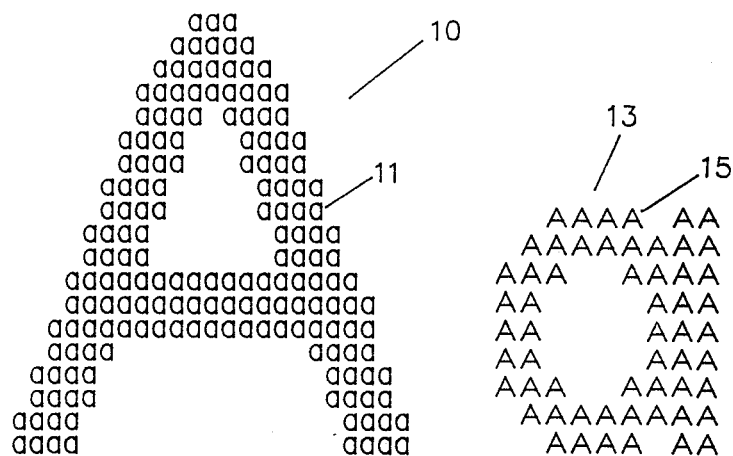
FIGS. 1a-1d are a graphical representation of a series of letters formed in accordance with the principle of the present invention.

Referring now to FIGS. 1a-1d, a series of letters representing the English alphabet formed according to the principles of the present invention is shown. As shown in FIG. 1a, the upper case representation of the English letter "A" 10 is formed by arranging a number of relatively small lower case letters "a" 11 such that the lower case letters 11 form a filled-in outline which provides a visual perception of the letter "A" 10. The lower case letters 11 are printed utilizing a thermographic process or other suitable raised-print process to provide raised letters which protrude slightly from the surface of the paper or other media which may be used. Thus a character, the letter "A" 10 in this example, is formed which provides a visual perception of its identity and tactile feedback when the character is felt or traced with a finger to reinforce that visual perception. For a child, especially when the child is too young to hold a pencil or stylus, tracing with the fingers provides a first step towards learning to write. Utilizing lower case letters 11 to fill in the outline of the upper case letter 10 also reinforces the association between those letters with very different upper and lower case representations.

Figure 1C:
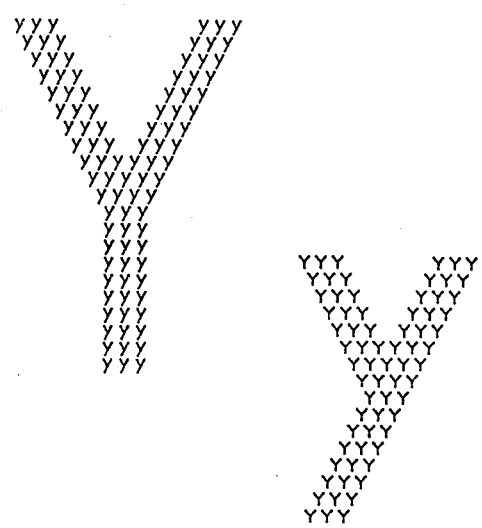
Figure 1D:
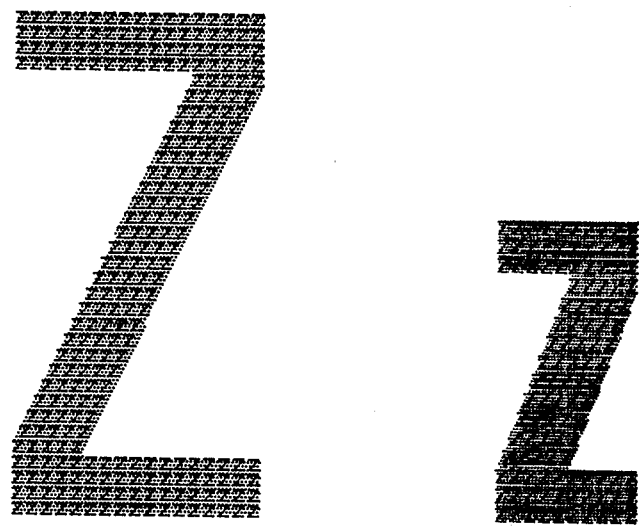

In a similar fashion, the lower case representation of the letter "a" 13 is formed by arranging a number of relatively small upper case letters "A" 15 to form a filled-in outline of a lower case letter "a" 13. As shown in FIGS. 1b-1d, the remaining letters of the alphabet or other set of characters are similarly formed.

The spacing of the smaller letters, the lower case letters "a" 11, for example, may be adjusted to allow a student to color in the background thus highlighting the large letter, the upper case letter "A" 10, for example, formed by the prearranged small letters. Alternatively, a lightly shaded large letter, "Z", for example, may be first printed by any standard printing process, such as a half-tone offset process, prior to printing the small letters, "z", for example, to provide a colored representation of the large letter as shown in FIG. 1d.

Figures 2A, 2B:
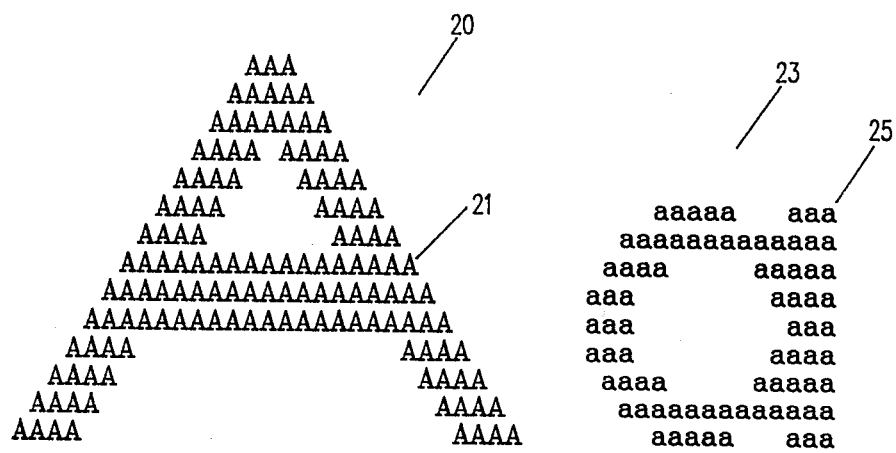
FIG. 2a is a graphical representation of the letter A formed in accordance with a second embodiment of the present invention.
FIG. 2b is a graphical representation of the numeral one formed in accordance with the principles of the present invention.

Referring now also to FIG. 2a, a second preferred embodiment of the present invention is shown. The upper case English letter "A" 20 is formed by arranging a number of relatively small upper case letters "a" 21 in such a manner that a filled-in outline of the English letter "A" 20 is provided. As described hereinabove, the small upper case letters 21 are printed using a thermographic process to produce raised print which protrudes slightly from the surface of the media thus allowing the outline of the large letter 20 and the shape of the individual small letters 21 to be perceived by touch. As shown in FIG. 2b, other characters such as numerals may also be formed in a similar manner.

Figure 3A:
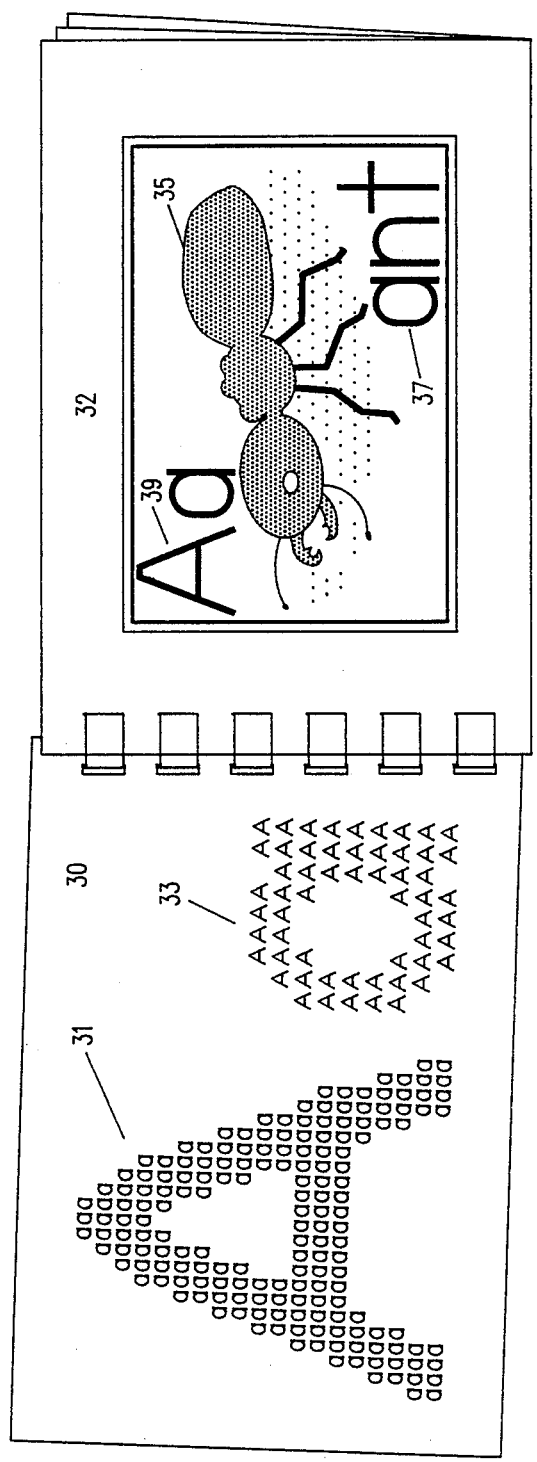
FIGS. 3a and 3b illustrate two pages of a booklet-form teaching aid incorporating the present invention.
Figure 3B:
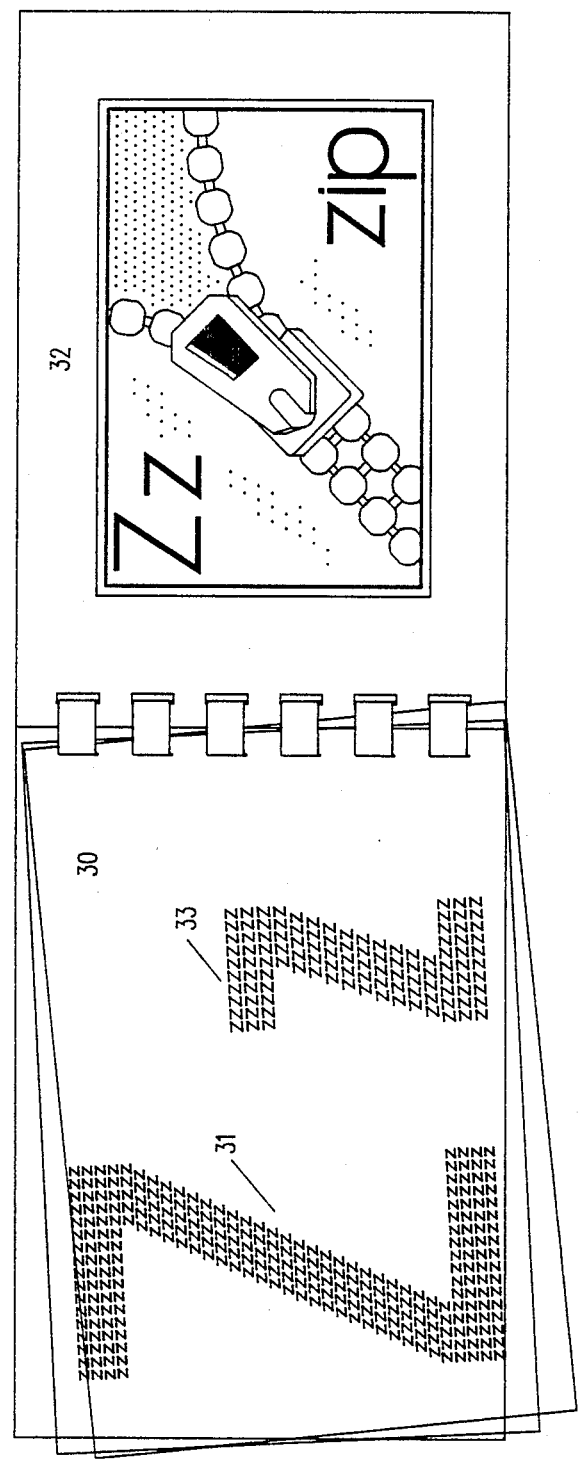

Referring now also to FIGS. 3a and 3b, two pages from a booklet-form teaching aid incorporating the present invention are shown. FIG. 3a illustrates the booklet opened to the page having the English letter "A" illustrated. The left-hand page 30 has the upper case and lower case letters 31 and 33, respectively, printed on it in accordance with the present invention while the facing, right-hand page 32 depicts an ant 35, the word "ant" 37 spelled out and repeats the upper and lower case letters "Aa" 39. The letters along with the animal or object pictured on the facing page may be colored as described hereinabove; further the letters may be color-coded, one color for vowels and a second color for consonants. The animal or object pictured on the facing, right-hand page is chosen to provide the student with the proper sound of the letter it is representing. Thus the booklet, when used with a human instructor or a computer which is programmed to speak and pronounce the letters, provides a teaching aid which successfully integrates all three sensory cues: touch, audio and visual. A sheet of tracing paper 36, as shown in FIG. 3b, may be included between the pages 30, 32 to allow the student to make a rubbing of the images of letters 31, 33.

The present invention has been described herein by way of example only and it will be appreciated that many variations are possible. For example, the character sets thus formed are not restricted to letters or to the English language; any set of characters in any language may be formed.

I claim:

1. A teaching aid in booklet-form comprising:
   a plurality of pages, each page having a different letter of an alphabet printed on a first side of said page and an object or animal depicted on a second side of said page, said object or animal associated with a letter of the alphabet, said associated letter different than the letter printed on the first side of said page, said plurality of pages arranged such that the first side of a page faces the second side of the next successive page, the letter on the first side of said page associated with the object or animal depicted on the second side of said next successive page;
   each of said different letters comprising a plurality of relatively small like letters disposed in spaced relationship on the surface of the first side of a different page and arranged in a pattern to form an outline of said letter, said outline filled in with said small like letters in said spaced relationship; and
   each of said small like letters formed to protrude slightly from the surface of the page.

2. A teaching aid in booklet-form as in claim 1 wherein each of said small like letters being a lower case representation of said different letter when said different letter is displayed as an upper case representation of said different letter and each of said small like letters being an upper case representation of said different letter when said different letter is displayed as a lower case representation of said different letter.

3. A teaching aid in booklet-form as in claim 1 wherein each of said small like letters being a lower case representation of said different letter when said different letter is displayed as a lower case representation of said different letter and each of said small like letters being an upper case representation of said different letter when said different letter is displayed as an upper case representation of said different letter.

4. A teaching aid in booklet-form as in claim 1 further comprising a plurality of sheets of tracing paper, one sheet of tracing paper inserted between each page and the next successive page such that a separate sheet of tracing paper overlays the protruding letters on the front side of each page.

* * * * *